United States Patent
Tise et al.

(10) Patent No.: US 6,864,827 B1
(45) Date of Patent: Mar. 8, 2005

(54) DIGITAL INTERMEDIATE FREQUENCY RECEIVER MODULE FOR USE IN AIRBORNE SAR APPLICATIONS

(75) Inventors: Bertice L. Tise, Albuquerque, NM (US); Dale F. Dubbert, Cedar Crest, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/686,379

(22) Filed: Oct. 15, 2003

(51) Int. Cl.[7] ............................................... G01S 13/90
(52) U.S. Cl. ................. 342/25 A; 342/25 D; 342/25 F; 342/194; 342/195
(58) Field of Search .............................. 342/25 R, 25 A, 342/25 B, 25 C, 25 D, 25 E, 25 F, 89, 98, 99, 115, 159, 162, 191–196

(56) References Cited

U.S. PATENT DOCUMENTS

| | | | | |
|---|---|---|---|---|
| 5,910,785 | A | * | 6/1999 | Normant .................... 342/25 R |
| 6,072,419 | A | * | 6/2000 | Normant .................... 342/25 R |
| 6,087,981 | A | * | 7/2000 | Normant et al. ............ 342/134 |
| 6,522,290 | B2 | * | 2/2003 | Mattox ........................ 342/194 |
| 6,608,585 | B2 | * | 8/2003 | Benitz ....................... 342/25 R |
| 6,628,844 | B1 | * | 9/2003 | Benitz ......................... 382/276 |
| 2002/0196179 | A1 | * | 12/2002 | Mattox ........................ 342/194 |
| 2003/0071750 | A1 | * | 4/2003 | Benitz ............................ 342/25 |

OTHER PUBLICATIONS

"Ultra–low range sidelobe pulse compression for satellite-borne rain radar", Griffiths, H.D.;Radar Conference, 1993., Record of the 1993 IEEE National, Apr. 20–22, 1993 pp.: 28–33.*

"Models and Useful Relations for Bistatic SAR Processing", Loffeld O. ; Nies H. ; Peters V. ; Knedlik S. ;IEEE Transactions on Geoscience and Remote Sensing : Accepted for future publication , vol: PP, Issue: 99, 2004 Ps:1–8.*

* cited by examiner

Primary Examiner—John B. Sotomayor
(74) Attorney, Agent, or Firm—Ortiz & Lopez, PLLC; Hrayr A. Sayadian

(57) ABSTRACT

A digital IF receiver (DRX) module directly compatible with advanced radar systems such as synthetic aperture radar (SAR) systems. The DRX can combine a 1 G-Sample/sec 8-bit ADC with high-speed digital signal processor, such as high gate-count FPGA technology or ASICs to realize a wideband IF receiver. DSP operations implemented in the DRX can include quadrature demodulation and multi-rate, variable-bandwidth IF filtering. Pulse-to-pulse (Doppler domain) filtering can also be implemented in the form of a presummer (accumulator) and an azimuth prefilter. An out of band noise source can be employed to provide a dither signal to the ADC, and later be removed by digital signal processing. Both the range and Doppler domain filtering operations can be implemented using a unique pane architecture which allows on-the-fly selection of the filter decimation factor, and hence, the filter bandwidth. The DRX module can include a standard VME-64 interface for control, status, and programming. An interface can provide phase history data to the real-time image formation processors. A third front-panel data port (FPDP) interface can send wide bandwidth, raw phase histories to a real-time phase history recorder for ground processing.

20 Claims, 12 Drawing Sheets

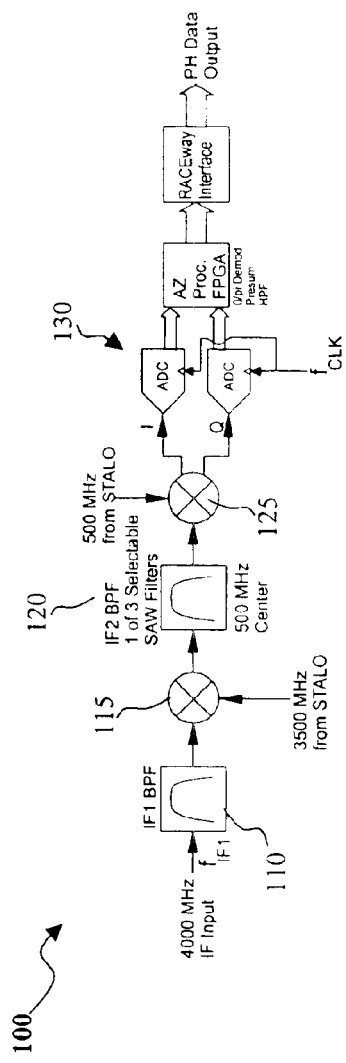
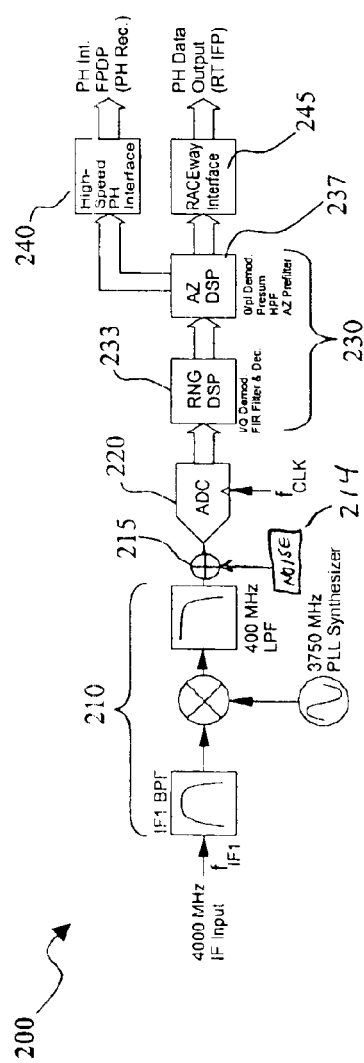

1210

1220

DIGITAL INTERMEDIATE FREQUENCY RECEIVER MODULE FOR USE IN AIRBORNE SAR APPLICATIONS

GOVERNMENT INTEREST

The present invention was developed under a contract with the United States Department of Energy under contract DE-AC04-94AL85000. Therefore, the U.S. Government has rights to use of the present invention.

FIELD OF THE INVENTION

The present invention is generally related to synthetic aperture radar systems. More particularly, the present invention is related to radar receiver modules. The present invention is also related to digital intermediate frequency receiver modules and their use in radar applications.

BACKGROUND

Fine-resolution, high-performance synthetic aperture radar (SAR) system having real-time image formation capabilities are currently being developed. For example, a system being developed by Sandia National Laboratories has a 4 GHz first intermediate frequency (IF) receiver. A simplified block diagram of the current generation IF receiver is shown in FIG. 1 which has been labeled as prior art.

The first IF is currently translated into a 500 MHz $2^{nd}$ IF 115, which facilitates the use of surface-acoustic wave (SAW) filters 120 for band-limiting the IF. The filtered $2^{nd}$ IF is then quadrature converted 125 to base-band video (I and Q channels) prior to analog-to-digital conversion at analog-to-digital converters (ADCs) 130. IF translations, filtering and analog quadrature demodulation are performed in the receiver module. The digitization and some front-end digital signal processing (DSP) (presumming and high-pass filtering) is performed in the analog-to-digital converter (ADC) modules 130.

The primary disadvantages of an analog receiver implementation are:

The IF filtering is performed in expensive and it is hard to find SAW filters 120 with limited pass-band and stop-band performance, A triple conversion receiver is required due to the need of a $2^{nd}$ IF frequency to accommodate the SAW filters, The analog quadrature demodulation circuit requires calibration, component screening, tuning, or all of the above to maintain adequate quadrature image rejection, Two balanced ADCs 130 are required, and The implementation has very little operational flexibility.

What is needed is an improved system or module for receiving IF. The present inventors have found a way to overcome the limitations of analog receivers in SAR systems with use of a digital IF receiver.

SUMMARY OF THE INVENTION

It is a feature of the present invention to provide a wideband SAR IF receiver, employing digital IF filtering and quadrature demodulation. A digital IF receiver upgrade can also be adapted to replace the analog receiver currently found in SAR systems.

In accordance with one aspect of the present invention, a wideband SAR IF receiver, employing digital IF filtering and quadrature demodulation, is provided.

In accordance with another aspect of the present invention, use of a programmable digital IF receiver (DRX) module enables additional SAR DSP functions, such as Doppler-domain pre-filtering, to be performed prior to image formation.

In accordance with another aspect of the present invention, a DRX module has been designed to be utilized for both a custom VME analog receiver and custom VME ADC module in the chassis of current generation radars. Both IF filtering and quadrature demodulation can be performed digitally using high-throughput DSP functions implemented in digital signal processor such as Field Programmable Gate Arrays (e.g., FPGAs such as the Xilinx or Altera FPGAs) or ASICs. Digital implementation of these two critical functions in reconfigurable logic not only can expand the flexibility and parameter space of the radar, but can also improve critical performance metrics such as quadrature image rejection, amplitude flatness, and phase linearity. An additional benefit of digital implementation is that many performance metrics are now scaled to resource usage.

In accordance with another aspect of the present invention, a dither signal is incorporated into the receiver to cause randomization of the quantization error. This dither signal is formed in a manner so that its spectrum does not overlap the desired signal, allowing its easy removal with digital signal processing, thereby enhancing Signal to Noise Ratio (SNR) over conventional techniques.

In accordance with unique features of the present invention, a digital receiver (DRX) is described that can include the following components: an intermediate frequency (IF) converter as an analog front end for the digital receiver, said IF converter adapted to translate a first IF into a second IF; an analog-to-digital converter (ADC); a digital signal processor (DSP) including IF domain and Doppler domain filtering; at least one phase history data interface; a high-pass filter, said high pass filter for removal of residual DC at the demodulator output; a 0/π demodulator for removing 0/π modulation introduced by the radar waveform synthesizer and for use in concert with a presummer to remove ADC DC and synchronous spurious signals such as clock leakage; and a presummer, said presummer for summing multiple input vectors to produce a single output vector.

In accordance with the unique operable features of the present invention, the IF converter can creates a second IF operating at about a center frequency that is lower than the first IF, the IF converter can adapt the digital receiver for compatibility with the first IF prior to signal processing through the ADC, and the at least one phase history data interface can move data from the digital receiver to real-time image formation processors via a high-speed switched fabric backplane, and to the phase history recorder via a standard front panel data port.

Additional novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

DESCRIPTION OF THE DRAWINGS

The accompanying figures, in which like reference numerals refer to identical or functionally-similar elements throughout the separate views and which are incorporated in and from part of the specification, further illustrate the present invention and, together with the detailed description of the invention, serve to explain the principles of the present invention.

FIG. 1 (prior art): Current generation SAR IF receiver employing analog filtering and analog quadrature demodulation.

FIG. 2: Simplified block diagram of the DRX module.

DETAILED DESCRIPTION OF PREFERRED EMBODIMENTS

Figure 3:
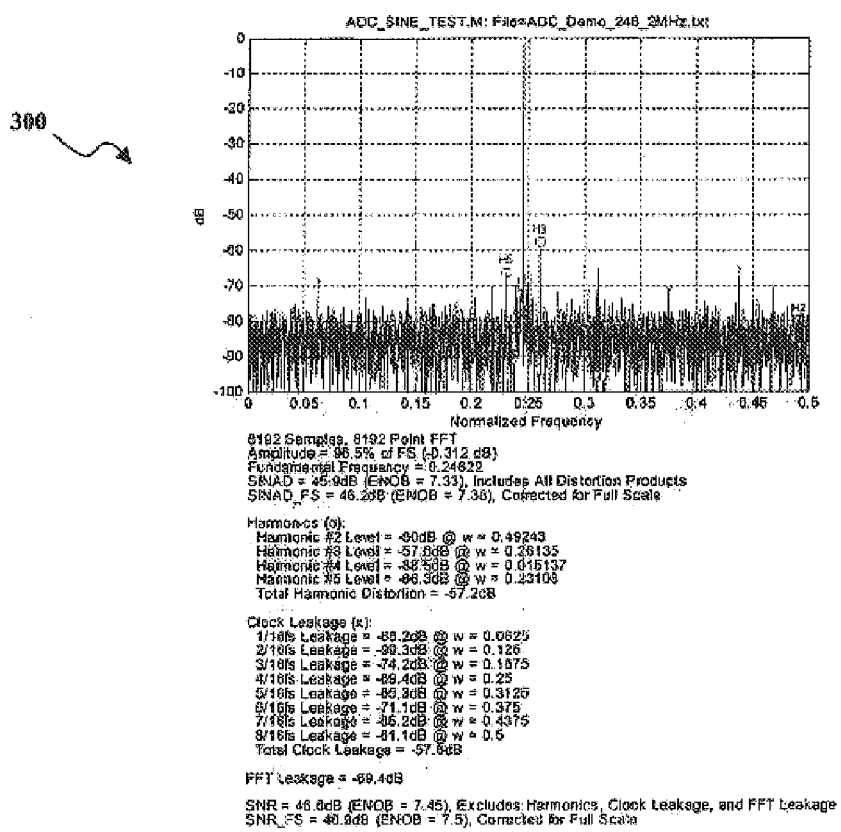
FIG. 3: Power spectral density (PSD) of the DRX demo board ADC output for a single tone at 246.22 MHz, with an ADC clock frequency of 1 GHz.

Referring to FIG. 2, a simplified block diagram of the digital receiver (DRX) module 200 useful in accordance with the present invention is shown. The DRX, as shown, can be segregated into 4 functional subsystems:

1. An IF converter 210 (analog front end), to translate, for example, a 4000 MHz radar $1^{st}$ IF into a 250 MHz $2^{nd}$ IF,
2. an 8-bit ADC 220 operating at 1 GS/s,
3. at least one digital signal processor (DSP) 230 such as a FPGA-based DSP including IF (range) domain 233 and Doppler (SAR azimuth) domain 237 filtering, and
4. phase history data interfaces 240/245.

The primary purpose of the IF converter 210 is to create a $2^{nd}$ IF at a center frequency, e.g., 250 MHz, that is substantially lower than the first IF, prior to the ADC 220. Other useful IF converter functions, including ADC noise dither, gain adjustment, and receiver blanking, can be included but are not all specifically shown in FIG. 2. Noise dithering can be introduced using an adder 225, which will be explained in more detail below. The IF converter 210 is necessary for compatibility with the existing radar 4 GHz $1^{st}$ IF. Also, the phase history data interfaces 240/245 are required to get data from the DRX 200 to the real-time image formation processors via a high-speed switched fabric backplane, and to the phase history recorder via a standard Front Panel Data Port (FPDP).

The general performance parameters and features of an embodiment of the DRX 200 are summarized in Table 1.

TABLE 1

Top-level performance parameters of the DRX module.

| Parameter | DRX | Comments |
|---|---|---|
| ADC Sample Rate | 1 GHz | |
| Max. Fast-Time Sample Rate | 250 MHz | Minimum range decimation factor = 4 |
| Max. Range Vector Size | 8192 | No APF applied |
| Quadrature Image Rejection | >65 dB | No calibration required |
| Number of Programmable IF Bandwidths | 38 | Range decimation factor from 4 to 256 |
| Maximum IF Bandwidth | 222 MHz | |
| Minimum IF Bandwidth | 3.5 MHz | |
| IF Filter ISLR | ~−58 dB | |
| Azimuth Prefilter Decimation | 1 to 8 | |
| Azimuth Prefilter Max. Vector Length | 4096 | |

The DRX 200 will equal, and in most cases, exceed the performance of the current analog receiver implementation. The DRX 200 will also add considerable flexibility and additional capability to the system. Some DRX improvements, relative to the current analog receiver implementation, are summarized as follows:

4×increase in SAR range swath,

Reduced real-time image formation processor load due to the presence of a Doppler prefilter (Azimuth Prefilter), 38 digitally selectable IF bandwidths, vs. 3 SAW filter bandwidths, means improved system SNR vs. operating range, No more SAW filters to develop and/or procure, Reduced minimum SAR operating range due high fast-time sample rate, Improved Multiplicative Noise Ratio (MNR) due to the improved stop-band rejection of the digital filters and the improved image rejection of the digital quadrature demodulator, and Reconfigurability of the DSP depending on the SAR application.

Out-of-Band noise dither to randomize the ADC quantization error without degradation to receiver SNR.

Not only does the present DRX 200 greatly enhance our current SAR data collection platform, but it also sets the stage for future implementations of SAR receivers employing high-throughput DSP functions.

The ADC

The performance of the Analog to Digital Converter (ADC) 220 is paramount in any high dynamic range radar application. In most implementations, the ADC 220 is the primary dynamic range limiter. For example, a Maxim Integrated Products (e.g., MAX108) 8-bit, 1.5 GS/s ADC has been utilized for DRX module 200. The sample rate and dynamic range of the MAX108 has been shown to satisfy requirements of a SAR receiver employing stretch processing (RF bandwidth compression or deramp mixing). A substantial portion of the DRX development effort has included detailed testing and analysis of the ADC. Critical ADC parameters measured include:

Dynamic Range, Including:
  Spurious Free Dynamic Range (SFDR)
  Signal to Noise Ratio (SNR),
  Effective Number of Bits (ENOB), and
Linearity (TOI).

Table 2 summarizes the general performance parameters of the MAX108 ADC.

TABLE 2

Measured performance summary of the MAX108 ADC.

| Parameter | Measurement | Description | Conditions |
|---|---|---|---|
| SNR | 46.9 dB | Signal to Noise Ratio, excluding harmonics and clock leakage. | 1 GHz sample rate, 125 to 375 MHz signal, full scale ADC input |
| ENOB | 7.5 | Effective Number of Bits | Same as SNR |
| SFDR | <−60 dB | Spurious Free Dynamic Range, excluding harmonics and clock leakage. | Same as SNR |
| THD | −53 dB | Total Harmonic Distortion | Worse case over 125 to 375 MHz, −1 dB FS amplitude. |
| $I_3$ | −57.9 dB | Two-Tone, $3^{rd}$-Order Intermodulation Level | 2 tones near 250 MHz, −6 dB FS per tone. |
| TOI | +18 dBm | Two-Tone, Third-Order Intercept | Same as $I_3$ |

ADC acquisition performance parameters were measured by the present inventors using a DRX prototype dubbed the "demo board". The demo board included a MAX108 ADC directly interfaced to a Xilinx™ XC2V1000 FPGA as the DSP. The board also included a well-known commercially standard Versa-Module Eurocard (VME) interface for control and data interfacing with a PC.

An example Power Spectral Density (PSD) plot 300 of the ADC output using the demo board for the data acquisition is shown in FIG. 3. The test tone as shown is a single sine wave at a frequency of 246.22 MHz. The calculated ENOB, less harmonics and clock leakage, is 7.5 bits. The ENOB was found by the present inventors to remain relatively constant over test frequencies, versus input power levels.

Figure 4:
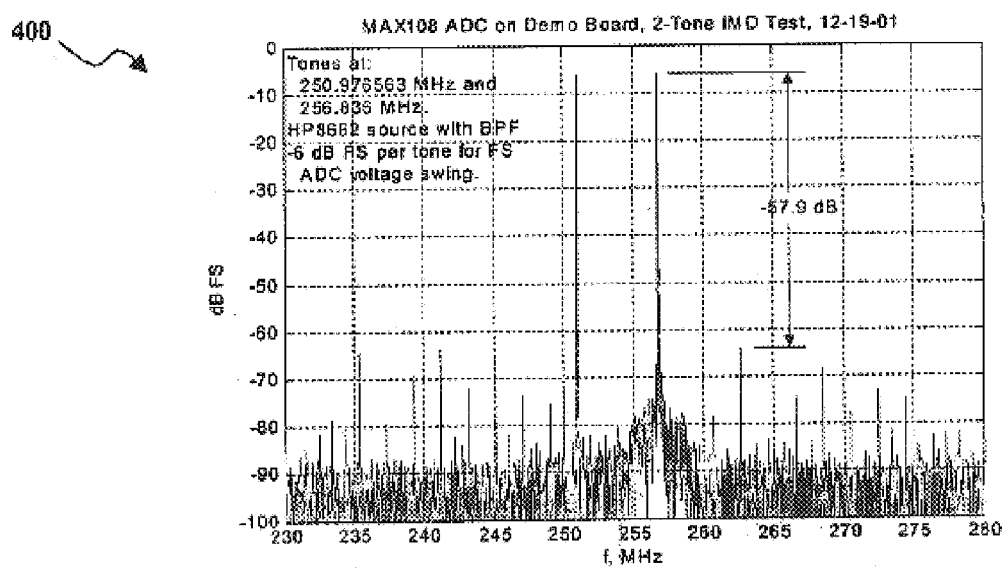
FIG. 4: Two-tone, 3rd-order intermodulation measurement of the ADC.

There was concern that the ADC will not have sufficient linearity to meet the SAR system requirements for maximum intermodulation spurious levels and total harmonic distortion (THD). A two-tone, third-order intercept (TOI) measurement was performed to determine degradation to the radar receiver intermodulation performance caused by the ADC. It is desirable that a two-tone signal with peak amplitude close to the ADC saturation point (within ~0.5 dB) result in an intermodulation level of <−45 to <−50 dBc. A third-order intermodulation measurement of the MAX108 is shown FIG. 4. A tested −57.9 dBc intermodulation level corresponded to a TOI of +18 dBm, which more than satisfied the linearity requirement.

As for the THD, the PSD plot of FIG. 3 shows a nominal THD of −57 dB. Frequency-swept measurements reveal a worse-case THD of −53 dB (Table 2), which satisfies the most stringent (<−50 dB) requirements.

ADC Noise Dithering

It is well known that the quantization process of the ADC introduces unwanted quantization spurious signals, which for certain IF signals such as single sine wave tones, are correlated with the desired signal. In a coherent radar system, the presence of spurious products, which are correlated with the signal of interest, is a major problem, since the "noise" correlation does not allow SNR improvement through coherent processing (ex: SAR image formation). The presence of an adequate level of random noise at the ADC input can be beneficial in that the noise tends to randomize the quantization noise. Typically, an SAR can be operated such that its receiver gain is set to maintain a thermal noise level at the ADC input of approximately one Least Significant Bit (LSB) RMS. Prior analysis has shown that this level adequately "dithers" the ADC quantization without adversely affecting the SNR performance of the radar. There are, however, some radar imaging scenarios where close range, high scene reflectivity, and the desire to operate at high transmitter power (jammer immunity), forces the receiver gain to be reduced below that which provides a 1-bit RMS noise level at the ADC input. Under these conditions, the existence of a few bright point targets in the image can cause unwanted quantization spurious in the image product.

Referring back to FIG. 2, to maintain adequate SNR with reduced receiver gain, a band limited noise source 214 can be implemented via an adder 215 to ensure that the ADC is properly dithered for all ranges of receiver gain. Since the noise is band limited (low pass filtered), it can essentially be removed by the digital range decimation filter in the form of an adder after the ADC. The result, under the reduced receiver gain scenario, is as much as an 11 dB improvement in attainable system SNR when compared to using in-band (broadband) noise.

Figure 5:
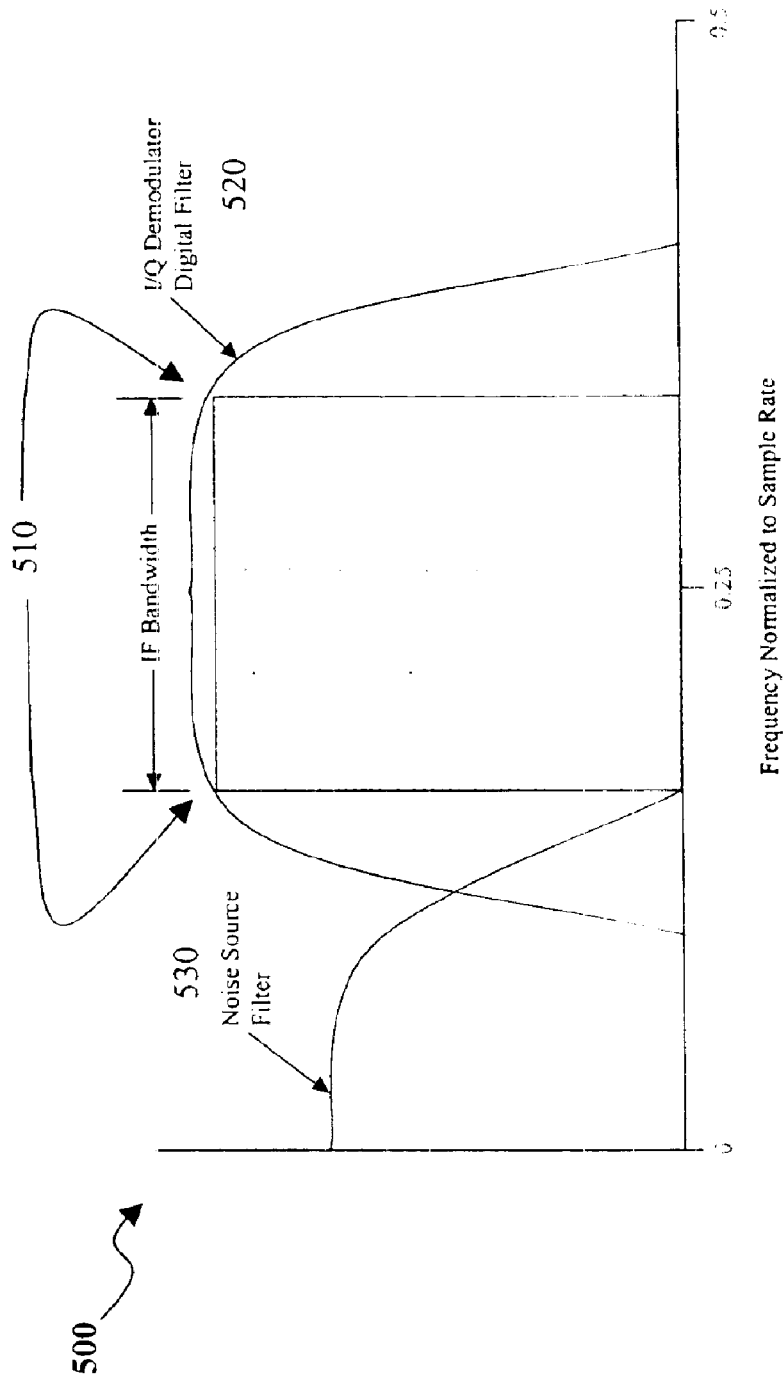
FIG. 5: Frequency domain illustration of the noise filter in relation to the IF signal band.
Figure 6:
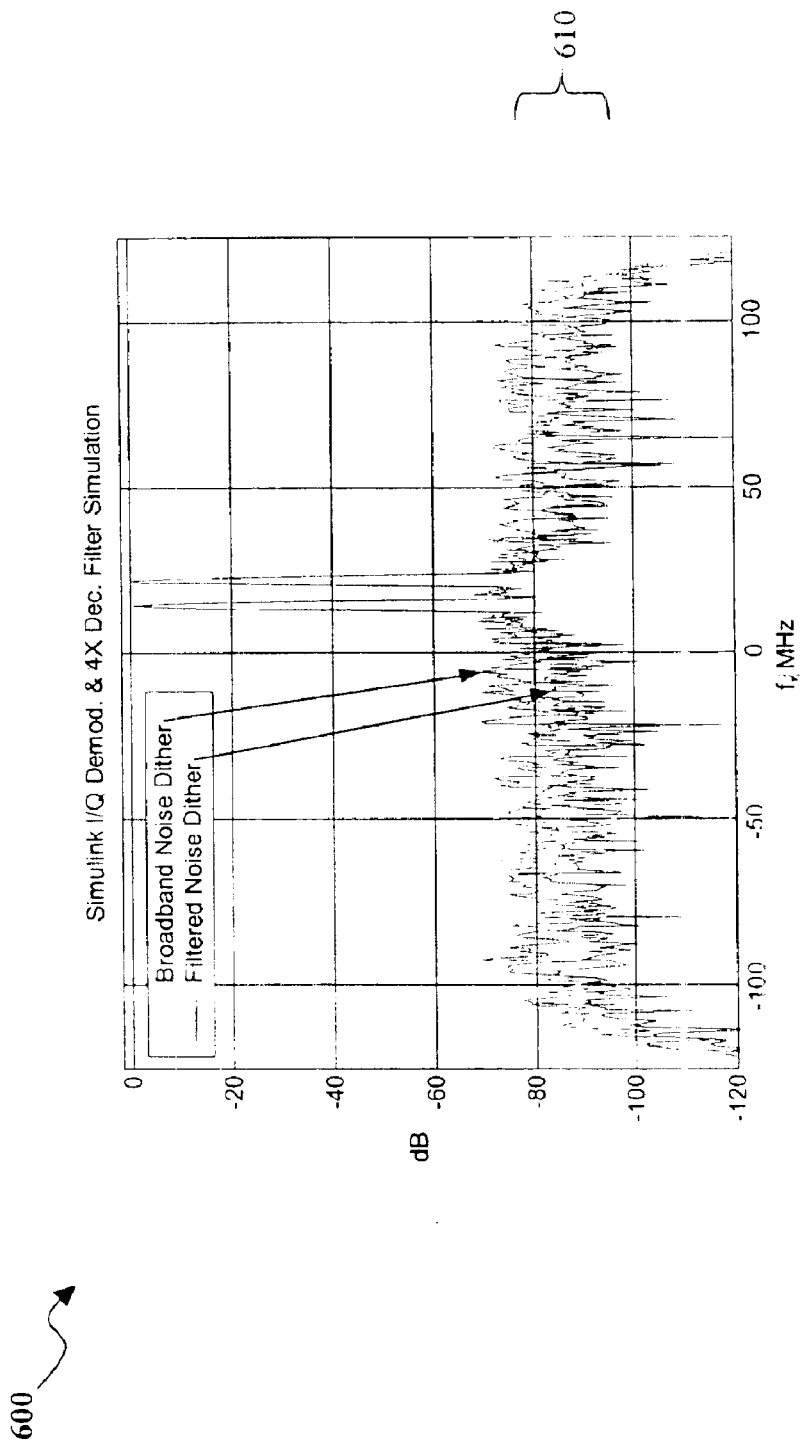
FIG. 6: Comparison of the quadrature demodulator/filter output cases: one with broadband noise dither, and the other with band-limited noise at the ADC input.

FIG. 5 illustrates the IF frequency domain relationship between the IF signal 510, the digital IF filter 520, and the noise source filter 530. The effect of using band-limited noise vs. broadband noise, on the SNR, is further illustrated in FIG. 6. In both the band-limited and broadband noise cases, the total noise level is set to 1-bit RMS at the ADC input. Note that the noise floor has been reduced 610 by approximately 11 dB for the band limited noise case.

The DRX Digital Signal Processor

Figure 7:
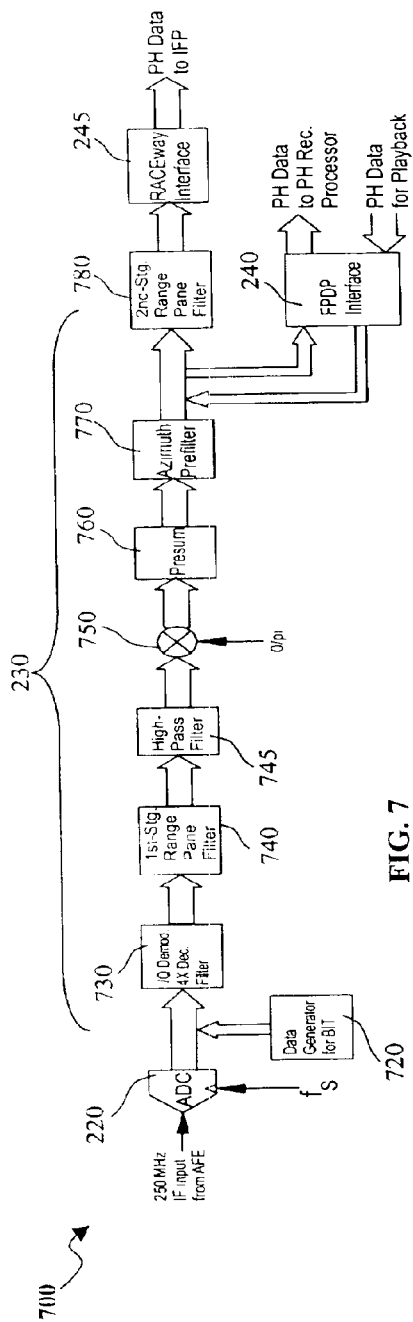
FIG. 7: Simplified block diagram of the DRX DSP chain.

Referring to FIG. 7, a simplified block diagram 700 of a DSP that can be utilized for DSP 230 as shown in FIG. 2, is presented. The DRX DSP used for the present invention can be viewed as necessarily being a high-throughput, high performance, two-dimensional (range and Doppler) prefilter for the SAR.

The output of the Analog Front End (AFE) submodule (IF converter), is input into the MAX108 ADC 710 operating at a sample rate ($f_S$) of 1 GHz. A necessary feature of the MAX108 is the inclusion of a built-in 1 to 2 demultiplexer. The two 8-bit demultiplexed channels, running at 500 MS/s, can be interfaced directly with the Virtex II FPGA I/O using a double data rate clock scheme. The data is then further demultiplexed 730 to 8 channels, each at a sample rate of 125 MS/s. This is the FPGA internal clock rate for the DSP blocks. The 8, 125 MS/s, 8-bit channels are the data input for the DSP.

Figure 8:
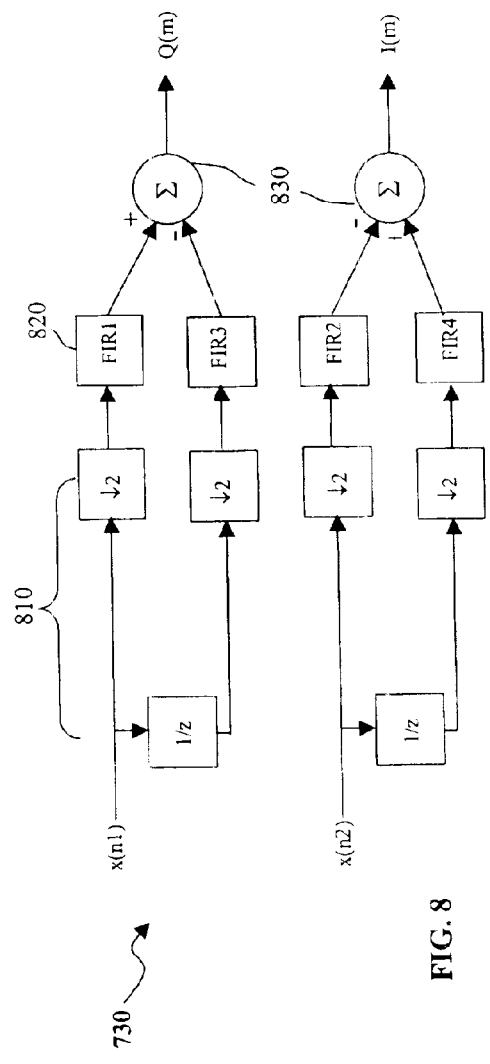
FIG. 8: Simplified demodulator/filter with two demultiplexed inputs.

As for integration of the $1^{st}$ stage range filter and quadrature demodulator, the first step is to produce quadrature demodulated signal pairs (I and Q) from the 1 GS/s data, centered at 250 MHz. A diagram of the filter/demodulator 730 is shown FIG. 8. Since the $2^{nd}$ F center frequency is at $¼^{th}$ of the ADC sample rate, quadrature demodulation can be efficiently implemented. The demodulator can be melded with a decimate-by-4 polyphase filter. The diagram shows two inputs x(n1) and x(n2), representative of the two 500 MS/s ADC outputs. Since the FPGA must be operated at a manageable clock frequency of 125 MS/s, additional parallelization is required to make the filter run at speed. The fully parallel demodulator/filter generally requires 16 parallel FIR filter blocks 820, each running at 125 MS/s, in order to handle the 1 GS/s aggregate input data rate. After summation 830, the output data rate of the demodulator/filter is 250 MS/s complex (I and Q).

Figure 9:
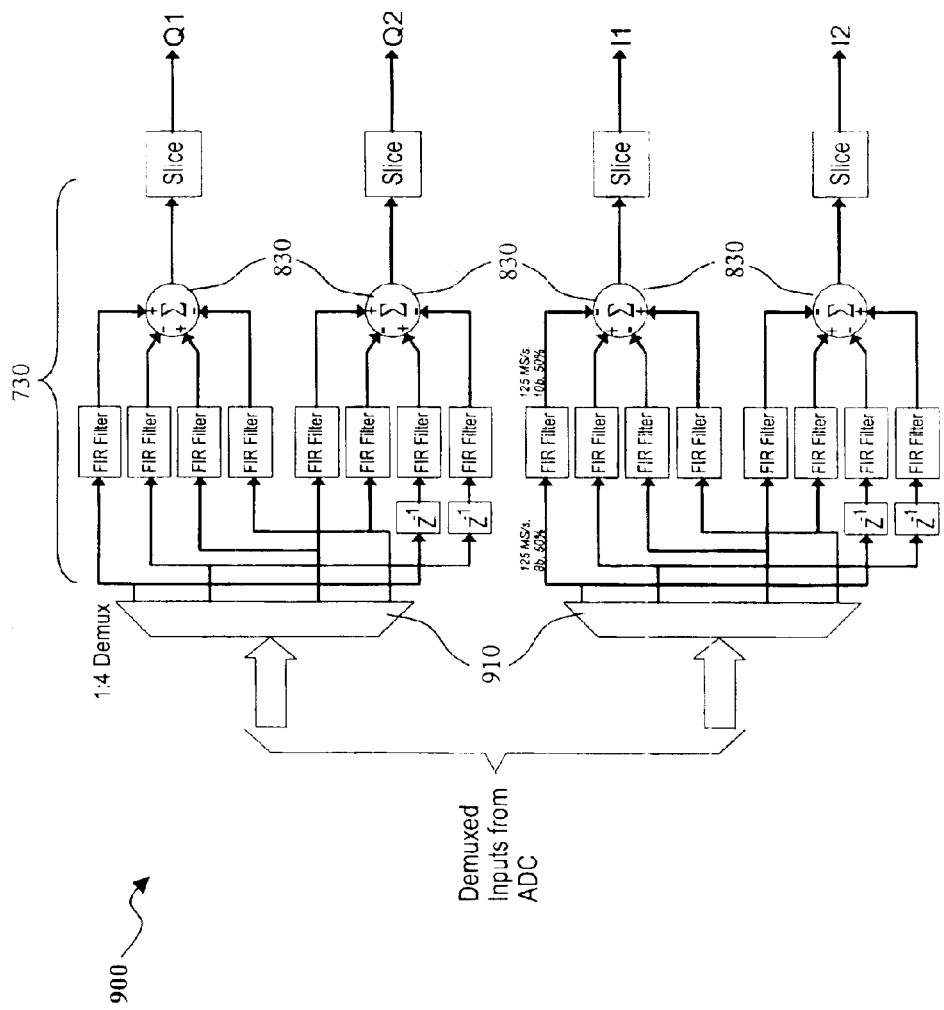
FIG. 9: Fully parallel demodulator/filter with input demultiplexer.

A block diagram 900 of a fully parallel implementation of the filter/demodulator 730, with an input demultiplexer 910, is shown in FIG. 9. Each I and Q channel is implemented as two demultiplexed channels operating at the FPGA clock rate of 125 MHz because the output aggregate data rate is 250 MS/s per I and Q.

Figure 10A:
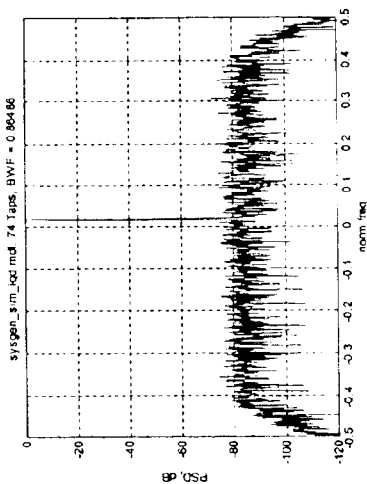
FIG. 10: Sample output PSD plots for the 74-tap demodulator/filter for a sine wave in noise, wherein the left plot is the Simulink/System Generator simulation; the right plot is the DRX hardware implementation.
Figure 10B:
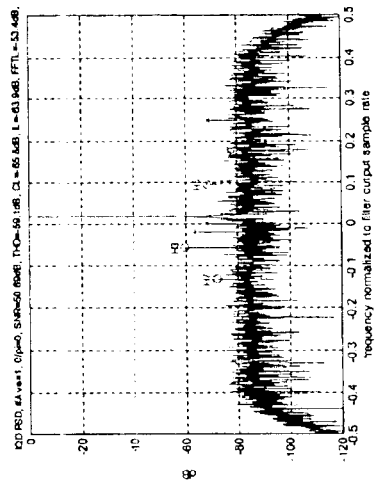

A sample output PSD plots of the simulated and hardware implemented demodulator are illustrated in FIGS. 10a and 10b, respectively. For both Power spectral density (PSD) plots, the demodulator input is a single sine wave tone slightly offset from the 250 MHz IF center frequency. Also present at the input is a 1-bit RMS, band limited noise source. The demodulator output of the simulation 1010 and hardware implementation 1020 show a single tone near DC with a very low quadrature image (<−60 dBc). A simulation tool used by the present inventors to obtain the output in FIGS. 10a and 10b was the Matlab™/Simulink™ technical computing environment with the Xilinx™ System Generator block set. The parallel filter implementation is equivalent to a 74 tap filter operating at an input data rate of 1 GS/s. The input signal to the DRX ADC is a single tone slightly offset in frequency from the $2^{nd}$ IF center of 250 MHz. In FIG. 10b, the presence of clock spurs (marked with "x"), harmonics (marked with "o"), and the quadrature image (marked with "*") in the hardware implemented output can be noted.

A pulsed radar such as SAR, which operates over a wide range of radar-to-target range, must maximize its transmitter pulse width to maximize the on-target average radar energy, in order to maximize the radar SNR. This requires the pulse width to vary as a function of range. In a pulsed radar employing stretch processing (RF to IF bandwidth compression), the necessary IF bandwidth generally must be varied inversely proportional to the pulse width and, hence, the radar range. In the current generation analog receiver (shown in FIG. 1), the IF bandwidth is determined by selecting one of three fixed SAW filters. In the DRX, the IF bandwidth can be selected by programming the range filter decimation factor. A high performance, high throughput filter topology will therefore be needed that has a variable decimation factor that can be adjusted "on-the-fly." The solution the present inventors successfully implemented can be referred to as the pane filter.

Figure 11:
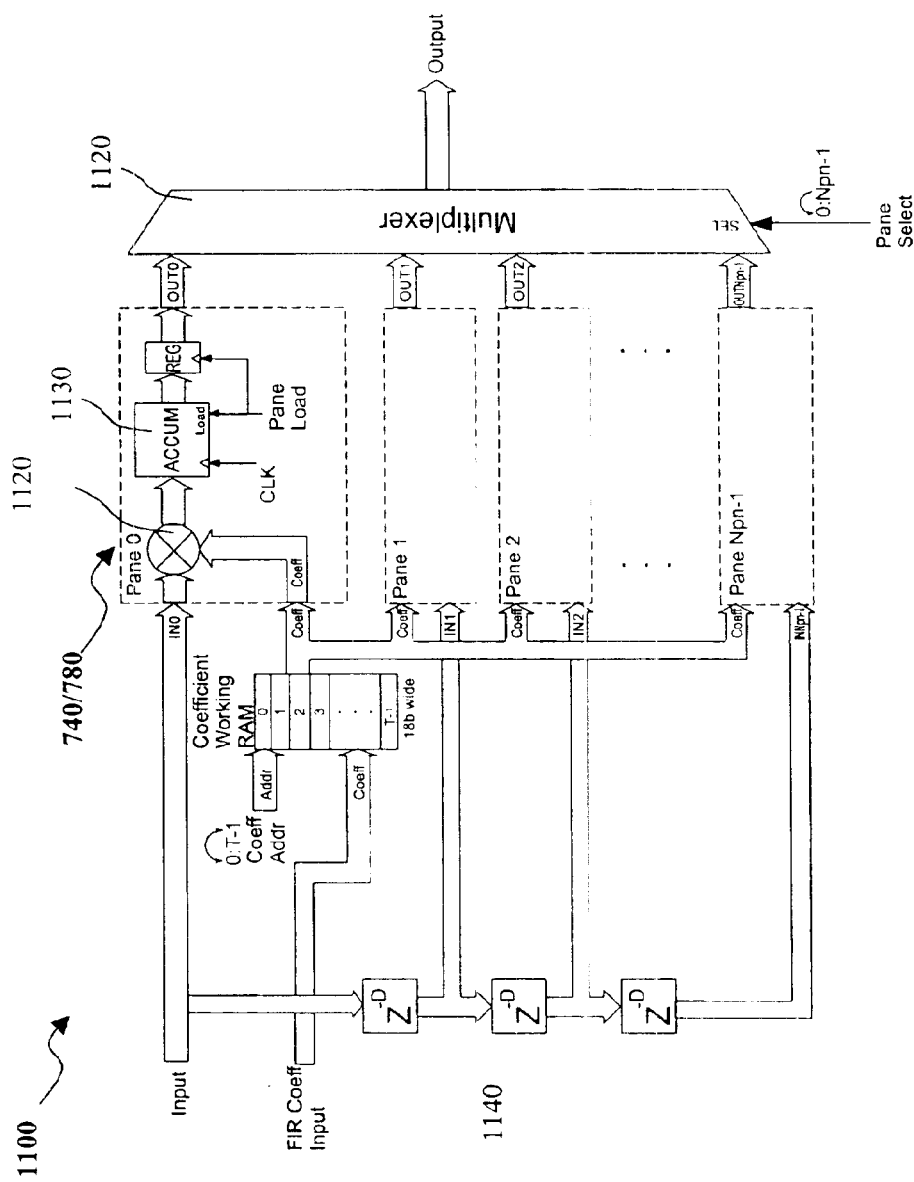
FIG. 11: Block diagram of the pane filter.

A simplified block diagram 1100 showing the incorporation of a pane filter 740/780, as discussed with respect to FIG. 7, is shown in FIG. 11. The pane filter 740/780 is a Multiply/Accumulate (MAC) based FIR filter with a polyphase construct.

Figure 12A:
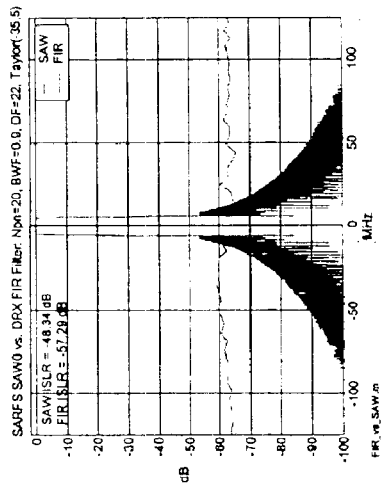
FIG. 12: Comparison of a 9.5 MHz bandwidth SAW filter to the 20 pane FIR filter with D=22.
Figure 12B:
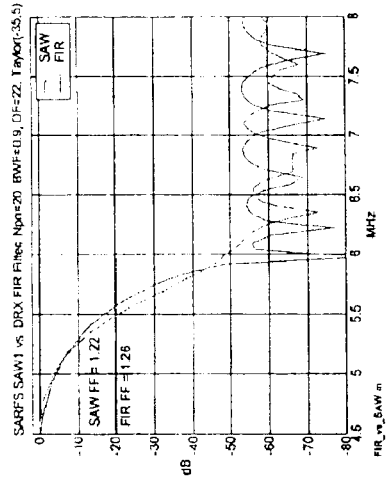

A pane filter, such as pane filter 740/780 shown in FIG. 7, can comprise of $N_{pm}$ panes 1110 with each pane utilizing a multiplier 1120 and an accumulator 1130, which together can be referred to as a "MAC". The data is distributed to each pane input via a tapped variable delay line 1140. The output of each pane is registered then sequentially selected with the output $N_{pm}$-to-1 multiplexer 1120. The number of panes required depends on the number of effective taps (T) necessary for the desired filter response. For a given number of taps and filter decimation factor D, the minimum number of panes required is simply T/D. For the DRX, the range pane filter requires 20 panes to meet our requirements for filter form factor and stop-band Integrated Sidelobe Ratio (ISLR). A comparison of the 20 pane FIR filter to a bandwidth equivalent SAW filter is shown in FIGS. 12a and 12b. Both a wideband 1210 response as well as a detailed filter transition band 1220 are shown.

Referring back to FIG. 7, the block diagram 700 shows two range pane filters, 740 and 780, at different locations in the DSP chain. The two-stage pane filter 740/780 affords some savings in FPGA resources, primarily in the form of coefficient registers. The location of the $2^{nd}$ pane filter 780 allows the range vector length to be reduced prior to real-time image formation. This is beneficial for radar systems with limited on-board processing capability.

Figure 13:
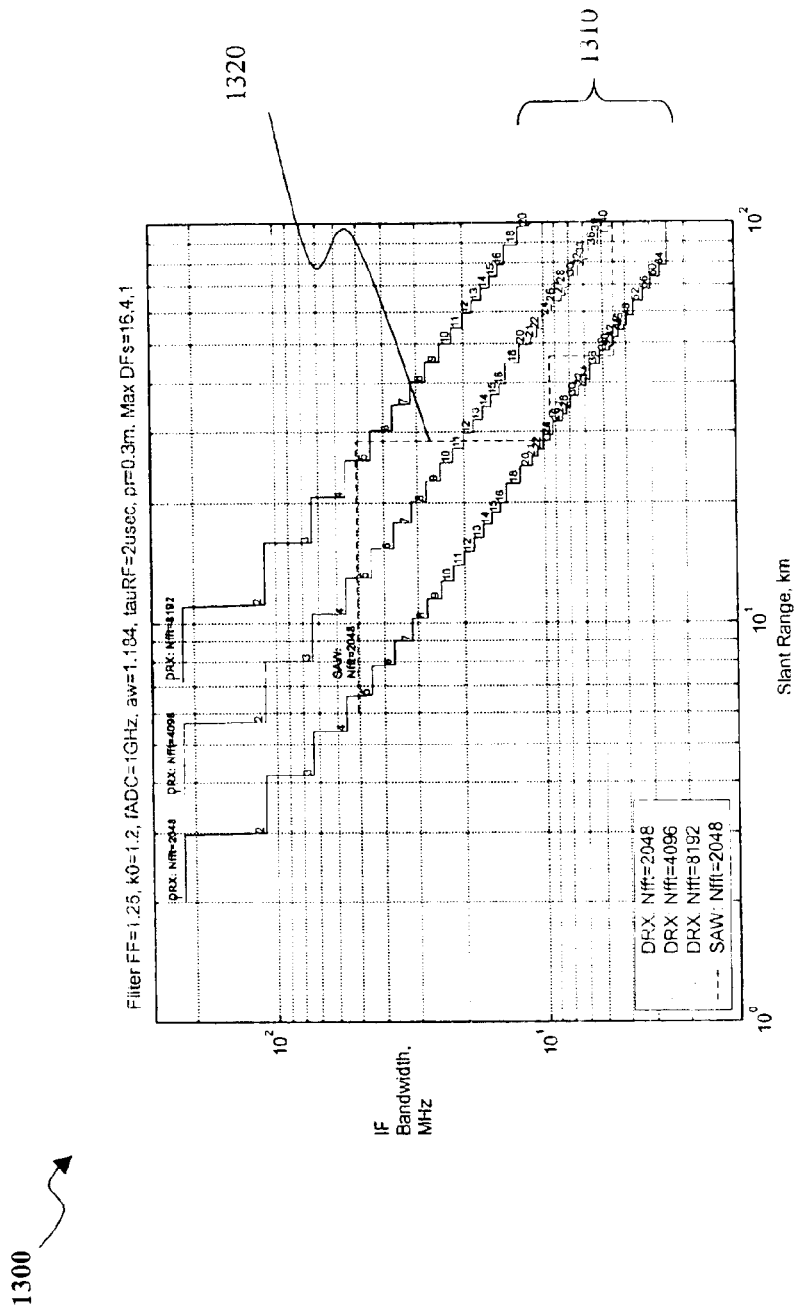
FIG. 13: IF bandwidth vs. radar operating range.

The two stage pane filter 740/780 allows the selection of one of 38 possible IF bandwidths in the 3.5 to 222 MHz range. FIG. 13 illustrates a plot 1300 of how the IF bandwidth of the DRX is selected as a function of radar range. For illustration purposes, three different range FFT lengths ($N_{FFT}$) 1310 of the image formation processor are shown. $N_{FFT}$ is roughly equal to the range vector length in the DRX DSP. A plot of the three SAW filter bandwidths 1320 for the analog receiver is shown for comparison.

The inclusion of a FIR decimation filter in the Doppler or pulse-to-pulse domain is a great asset for many airborne SAR applications. By prefiltering and decimating the SAR azimuth samples, which are essentially vectors of range samples, the phase history data rate can be reduced significantly. Such a filter is dubbed the Azimuth Prefilter or APF. Referring again to FIG. 7, an Azimuth Prefilter 770 is shown incorporated in the system. Inclusion of an APF 770 is beneficial to systems where the illuminated Doppler bandwidth of the antenna greatly exceeds the Doppler bandwidth subtended by the final image product. A good example of such a system is the Sandia National Laboratories developed Concealed Target SAR (CTSAR), which operates within the 1 to 4 GHz band. For CTSAR, the APF 770 will cut the phase history data rate in half without sacrificing image size (along-track scene extent). This is highly desirable, considering the high phase history data rates for the CTSAR system and capabilities of current high speed data recorders.

Figure 14:
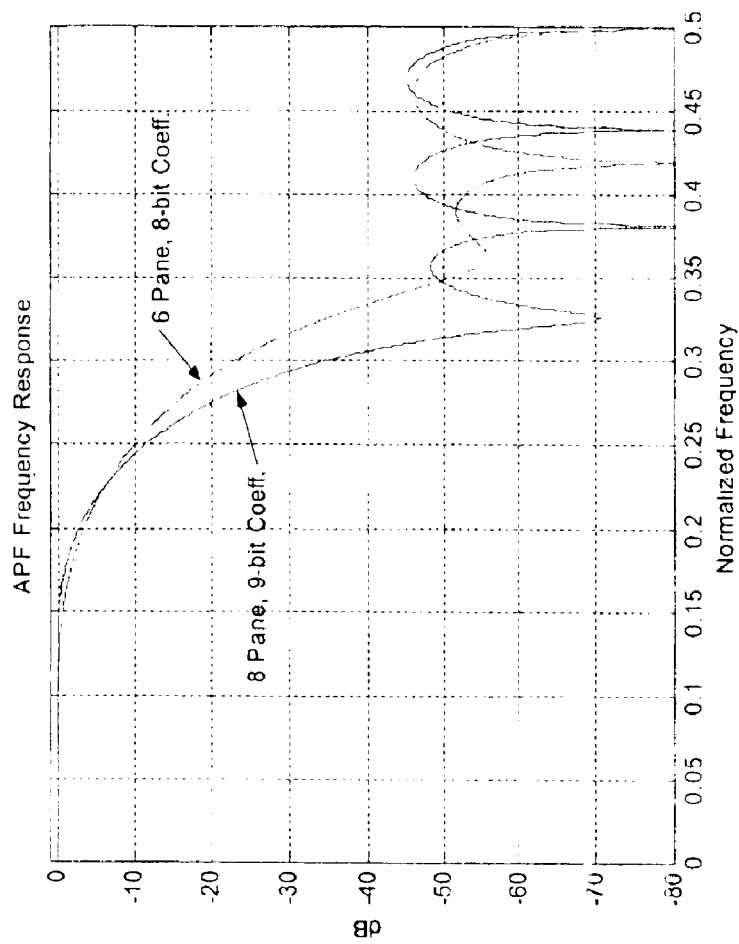
FIG. 14: Frequency response for two azimuth prefilter (APF) examples.

A sample 1400 of the decimate-by-two (D=2) filter response for a 6 and an 8-pane implementation of the DRX APF 770 is shown in FIG. 14. As with the range pane filters 740/780, the decimation factor is variable. The 6-pane APF for the DRX supports decimation factors from 1 to 8.

The APF 770 is implemented as a pane architecture similar to the range pane filter, with the exception that the APF filters data vectors as opposed to individual samples. The APF also delays the coefficients distributed to each pane, as opposed to the delayed-data implementation shown in FIG. 11. Since the accumulators must store accumulated vectors, the APF can consume large amounts of FPGA block RAM. Fortunately, the larger Virtex II FPGAs have been shown to possess ample block RAM to support the APF.

As shown by many test situations conducted by the inventors, it is desirable to inject a test signal at the DRX DSP input without having to connect an analog signal source. A good signal source for testing the DRX DSP chain is a simple sine wave tone. This can easily be implemented in the FPGA as a dual accumulator and sine ROM Direct Digital Synthesizer (DDS). As shown in FIG. 7, the location of the data generator 720 at the filter/demodulator input requires it to be implemented as 8 parallel channels.

To provide a simulated noise floor, the data generator 720 includes a Linear Feedback Shift Register (LFSR) pseudorandom noise generator (not shown).

Again referring to FIG. 7, a handful of additional DSP blocks are included in the DRX 700 to facilitate miscellaneous DSP functions and to support various radar modes. The additional functions include a high-pass filter 745, a 0/π demodulator 750, and a presummer 760.

The high-pass filter 745 serves to remove residual DC at the filter/demodulator output 735. In radar employing analog quadrature demodulation, the high-pass filter 745 primarily removes the unwanted DC bias of the ADCs. For the DRX, the ADC DC bias is practically eliminated by the digital quadrature demodulator 730. The high-pass filter 745 is only included in the DRX to eliminate any 250 MHz ADC data clock leakage which would manifest itself as DC at the demodulator output.

The 0/π demodulator 750 serves to remove 0/π modulation introduced by the radar waveform synthesizer (not shown). 0/π modulation/demodulation is used routinely, in concert with the presummer 760, to remove ADC DC and synchronous spurious signals such as clock leakage. The demodulator 750, shown as a multiplier in FIG. 7 can in reality be nothing more that a 2s compliment negation operation, easily implemented in known hardware.

The presummer 760 is a vector accumulator which serves to sum multiple input vectors to produce a single output vector. The presummer 760 is very beneficial for airborne platforms with wide margins between the minimum required Pulse Repetition Frequency (PRF) and the maximum allowable PRF for non-ambiguous range operation.

DRX Module Implementation

The DRX module can be implemented on a standard 6U (6×9 inch) VME card, although other implementation can be appreciated. The DSP was implemented by the present inventors in two Xilinx™ XC2V6000 FPGAs, each with 6 million gates. The Virtex II™ FPGA includes embedded 18×18 bit hardware multipliers, which are essential for implementing the pane filters. The Virtex II™ FPGA also includes high-speed, dual port block RAM, which can be a valuable resource for the APF accumulators, as well as other data buffers in the DSP. A resource usage summary for a prototype DRX DSP is shown in Table 3.

TABLE 3

FPGA resource usage estimate for the DRX DSP.

| DSP Block | Parameters | Block RAM | HW Mult. | LCs (k) |
|---|---|---|---|---|
| 2:8 Demux | | | | 1 |
| Data Gen. | 12 b Accum. DDS | 4 | | 1 |
| Demod/Filt. | 74 Taps, 12 b Coeff. | | | 20 |
| 1st Range Pane Filter | | 8 | 80 | 28 |
| Rate Buffer | | 16 | | 1 |
| HPF | | | | 2 |
| 0/pi Demod. | | | | 1 |
| Presummer | | 24 | | 1 |
| APF 1 | | 74 | 12 | 6 |
| Misc. | | 5 | | 5 |
| Totals (FPGA 1): | | 131 | 92 | 66 |
| % Utilization of XC2V6000 (FPGA 1): | | 91 | 64 | 87 |
| APF 2 | | 74 | 12 | 6 |
| PH FIFO | | 16 | | 1 |
| IFP FIFO | | 8 | | 1 |
| 2nd Range Pane Filter | | 8 | 40 | 17 |
| RACEway FIFO | | 8 | | 1 |
| Misc. | | 5 | | 5 |
| Totals (FPGA 2): | | 119 | 52 | 31 |
| % Utilization of XC2V6000 (FPGA 2): | | 83 | 36 | 41 |

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving fill cognizance to equivalents in all respects.

What is claimed is:

1. A digital receiver for use in radar systems, comprising:
   an intermediate frequency (IF) converter to translate a higher frequency 1st IF to a lower frequency 2nd IF;
   an analog-to-digital converter (ADC);
   a digital signal processor (DSP) including IF (range) domain and Doppler (azimuth) domain filtering, and
   at least one phase history data interface;
   wherein the IF converter translates a given radar 1st IF frequency to a 2nd IF necessary to facilitate sampling and efficient quadrature demodulation, and at least one phase history output interface moves data to an image formation processor or a raw phase history storage subsystem.

2. The invention of claim 1 wherein an out-of-band noise source provides a dither signal to the ADC to cause randomization of the ADC quantization error to thereby enhance the signal-to-noise ratio (SNR).

3. The invention of claim 2 wherein the noise is formed in a manner so that its spectrum does not overlap the desired signal, allowing its subsequent removal by filtering.

4. The invention of claim 3 wherein the noise introduced by the out-of-band noise source is removed to improve the radar receiver signal to noise ratio (SNR).

5. The invention of claim 1 wherein said second IF frequency is one fourth of the ADC sample frequency.

6. The invention of claim 5 wherein a quadrature demodulator and 1st-stage IF filter converts the sampled 2nd IF at the output of the ADC to base-band quadrature outputs (I and Q).

7. The invention of claim 5 further comprising a programmable data generator at the output of the ADC that provides a test signal to excite the DSP chain without the introduction of the analog IF input.

8. The invention of claim 6 further comprising a range pane filter connected to said quadrature outputs and having an IF filter with digitally selectable IF bandwidth.

9. The invention of claim 8 further comprising
   a high-pass filter at the output of said pane filter for removal of residual DC (zero frequency) at the output of the quadrature demodulator;
   a 0/π demodulator at the output of said high-pass filter for removing spurious modulation introduced by a radar exciter; and
   a vector presummer connected to said 0/π demodulator for adding multiple input vectors to produce a single output vector (azimuth sample).

10. The invention of claim 9 further comprising an azimuth prefilter (APF) with digitally selectable Doppler bandwidth connected to said presummer to filter presumed output vectors in the azimuth sample or Doppler domain.

11. The invention of claim 10 further comprising a 2nd range pane filter stage with digitally selectable bandwidth connected to said prefilter for further filtering and decimating each range vector.

12. The invention of claim 8 wherein a said IF filter has a multitude of IF bandwidths that are selectable to maximize the radar pulse width, thus maximizing the radar SNR versus radar operating range.

13. The invention of claims 8 wherein said IF filter has reprogrammable coefficients.

14. The invention of claim 1 wherein two phase history output interfaces are provided.

15. The invention of claim 14 wherein one of the phase history outputs provides raw presummed phase histories destined for a data recording system.

16. The invention of claim 15 wherein one of the phase history outputs provides range and Doppler pre-filtered and decimated data via a switch-fabric interface to a real-time image formation processor.

17. The invention of claim 16 wherein an out-of-band noise source provides a dither signal to the ADC to cause randomization of the ADC quantization error to thereby enhance the signal-to-noise ratio (SNR).

18. The invention of claim 17 wherein the noise is formed in a manner so that its spectrum does not overlap the desired signal, allowing its subsequent removal by filtering.

19. The invention of claim 18 wherein the noise introduced by the out-of-band noise source is removed to improve the radar receiver signal to noise ratio (SNR).

20. The invention of claim 1 wherein the first IF is at about 4 GHz and the second IF frequency is at about 250 MHz.

* * * * *